United States Patent [19]
Ishibashi et al.

[11] 3,819,943
[45] June 25, 1974

[54] METHOD AND APPARATUS FOR DETECTING DEFECTS IN A SEALED PORTION OF A PACKAGE

[75] Inventors: Kazuhisa Ishibashi; Yoshimi Terashima, both of Tokyo, Japan

[73] Assignee: Toyo Seikan Kaisha, Limited, Tokyo, Japan

[22] Filed: Dec. 5, 1972

[21] Appl. No.: 312,409

[30] Foreign Application Priority Data
- Dec. 17, 1971 Japan............................. 46-102362
- Feb. 25, 1972 Japan............................. 47-19492
- Mar. 7, 1972 Japan............................. 47-23330

[52] U.S. Cl.................................. 250/341, 250/338
[51] Int. Cl................................................ G01j 5/12
[58] Field of Search...................... 250/338, 341, 340

[56] References Cited
UNITED STATES PATENTS

| | | | |
|---|---|---|---|
| 3,378,685 | 4/1968 | Green et al.......................... | 250/341 |
| 3,460,893 | 8/1969 | Wilks, Jr............................ | 250/338 X |
| 3,462,602 | 8/1969 | Apple................................. | 250/338 |

*Primary Examiner*—Archie R. Borchelt
*Attorney, Agent, or Firm*—George Vande Sande

[57] ABSTRACT

Methods and apparatus for detecting defects in a sealed portion of a package, in which at least one sealed portion is interposed between a thermal member having a predetermined temperature distribution on its surface faced to said selaed portion and a temperature measuring device having some groups of temperature sensors on its surface faced to the opposite surface of the sealed portion, and the outputs of groups of temperature sensors are compared each other. Any difference between them means that the sealed portion is defective.

6 Claims, 19 Drawing Figures

3,819,943

METHOD AND APPARATUS FOR DETECTING DEFECTS IN A SEALED PORTION OF A PACKAGE

DETAILED DESCRIPTION OF THE INVENTION

The present invention relates to a sealed package and more particularly to a method and apparatus for inspecting the sealed portion of a package. Although not restrictive, the present invention is particularly suitable for detecting defects in the sealed portion of a flexible pouch with or without laminated metal foils, or of a container with sealed portions being made of heat sealable material or laminated with heat sealable material.

Hithertofore, it has been a common practice to visually inspect the sealed portion of the package to find any defect therein, however, this method is disadvantageous in that it is difficult to detect microscopic defects. Moreover, the visual method is time consuming. Alternatively, it has been proposed to use infrared ray in detecting defects of the sealed portion. According to this method, it is arranged that infrared ray is applied to the sealed portion of the package and the temperature of the sealed portion is measured by an infrared ray detector. Since the increasing rate of temperature in a defective area is lower than that in a satisfactorily sealed area, any defect in the sealed portion can be detected by measuring the temperature of the sealed portion. However, the conventional infrared ray method is disadvantageous in that it is necessary to effect a step of scanning through the sealed portion by means of an infrared ray radiating device. Therefore, this also is not a method adapted for very quick detecting.

One object of the present invention is to provide a method and apparatus for instantly detecting defects being present in the sealed portion of the package.

Another object of the present invention is to provide a novel method of the type described with which detecting any fine defect in a sealed portion is attainable in a reliable and efficient manner.

A further object of the present invention is to provide an apparatus of the type described which is mechanically simple and inexpensive to manufacture.

According to the present invention, there is provided a method for detecting defects present in the sealed portion of the package, said method comprising the steps of subjecting the sealed portion to a temperature change, measuring the temperature in the sealed portion and comparing the measured temperature with a reference value. When the measured temperature is different from the reference value, it is obvious that there is a defect in the seal. According to one mode of the present invention, the reference value is obtained by providing a reference seal which is subjected to a temperature change simultaneously with the sealed portion of the package to be inspected, and measuring the temperature of the reference seal. According to another mode of the present invention, a sealed portion to be inspected is divided into a plurality of segments which are simultaneously subjected to temperature change and the temperatures of the segments are separately measured. The temperature of one segment is utilized as the reference value for another segment. That is, this invention has a reference in itself.

According to the present invention, there is also provided a novel apparatus for detecting defects of the sealed portion in the package.

The above and other objects and features of the present invention will become apparent from the following descriptions of preferred embodiments which are illustrated in the accompanying drawings, in which;

FIG. 1 is a diagrammatical perspective view of an apparatus embodying the invention;

FIG. 2 A and 2 B, respectively, show elevational front and cross-sectional views of a temperature detector used in the apparatus shown in FIG. 1;

Figure 7:
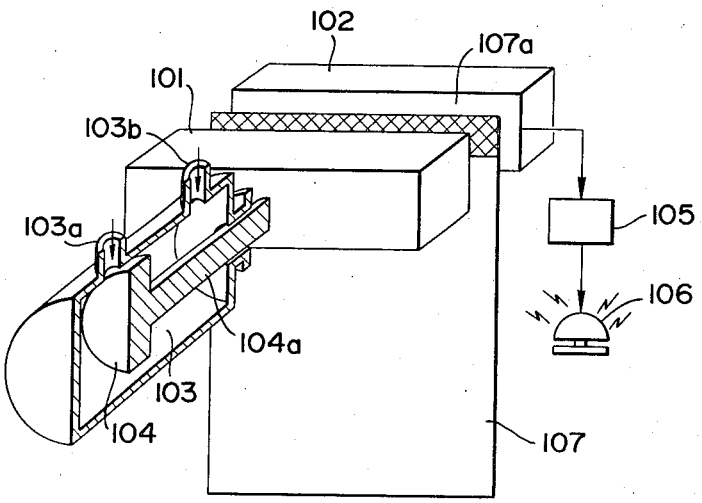
FIG. 7 is a diagrammatical perspective view similar to FIG. 1 but showing another embodiment of the invention.
Figure 8A:
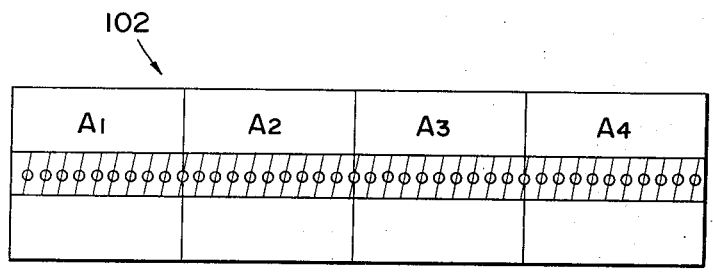
Figure 8B:
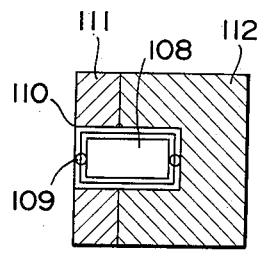
Figure 9:
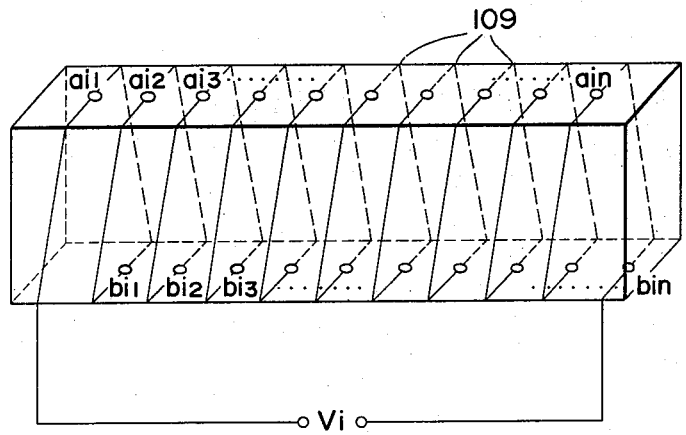
Figure 10:
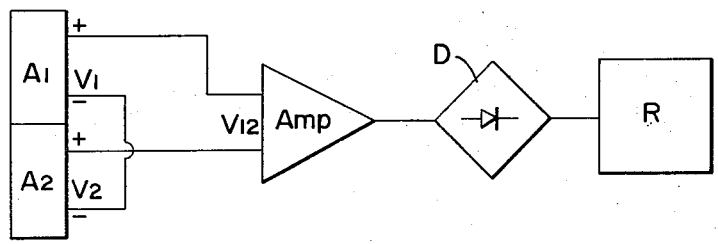
Figure 11:
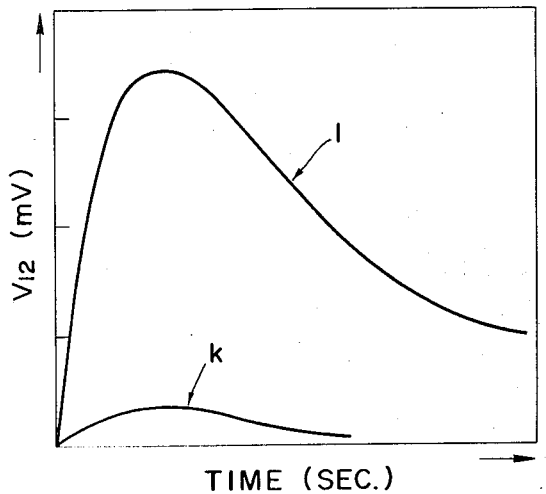
Figure 12:
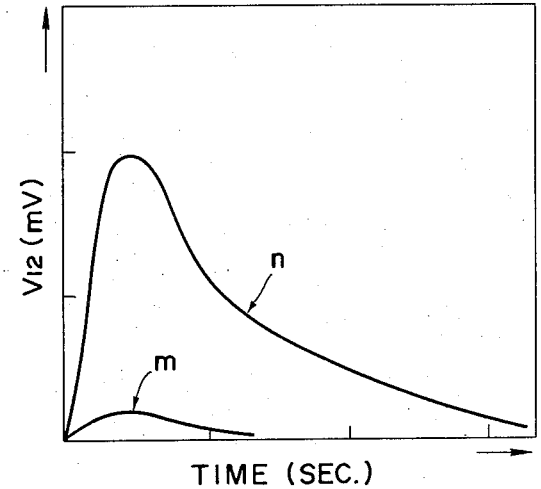
Figure 13:
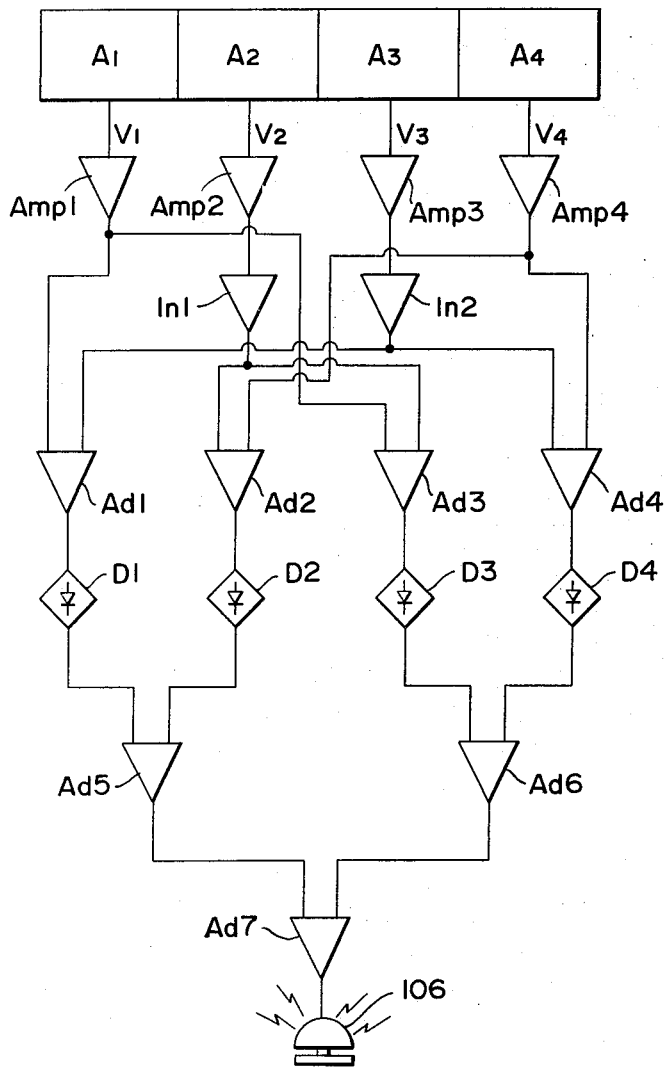
Figure 14A:
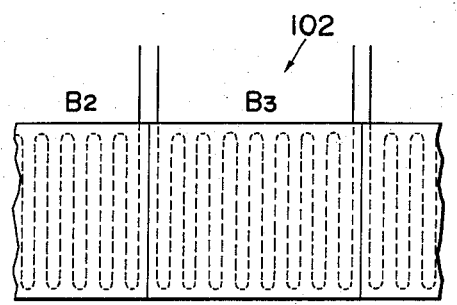
Figure 14B:
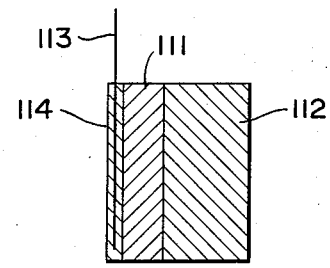
Figure 15:
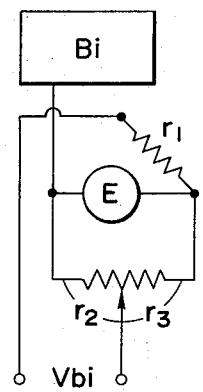
Figure 16:
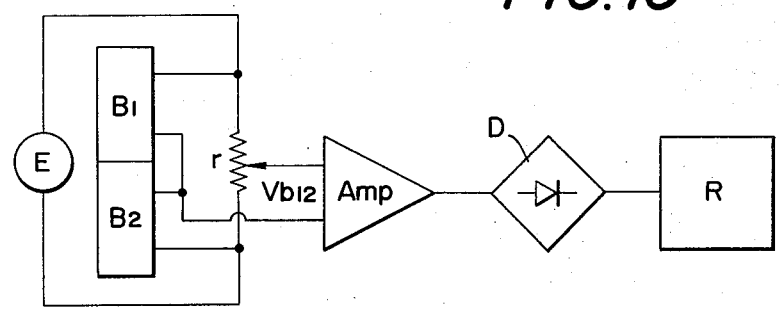

FIGS. 8 A and 8 B, respectively, show elevational front and cross-sectional views of a temperature detector used in the apparatus of FIG. 7;

FIG. 9 is a perspective view of a thermo-couple used in the apparatus of FIG. 7;

FIG. 10 is a block diagram showing an example of the electrical system used in the apparatus of FIG. 7;

FIGS. 11 and 12 show diagrams illustrating the output of the temperature detector;

FIG. 13 is a block diagram showing another example of the electrical system used in the apparatus of FIG. 7;

FIGS. 14 A and 14 B show front and side views of a temperature detector being substituted for that of FIG. 8;

FIG. 15 is a circuit diagram of an electrical system which is used with the temperature detector of FIG. 14; and, FIG. 16 is a diagram similar to FIG. 10 but using the temperature detector of FIG. 14.

Figure 1:
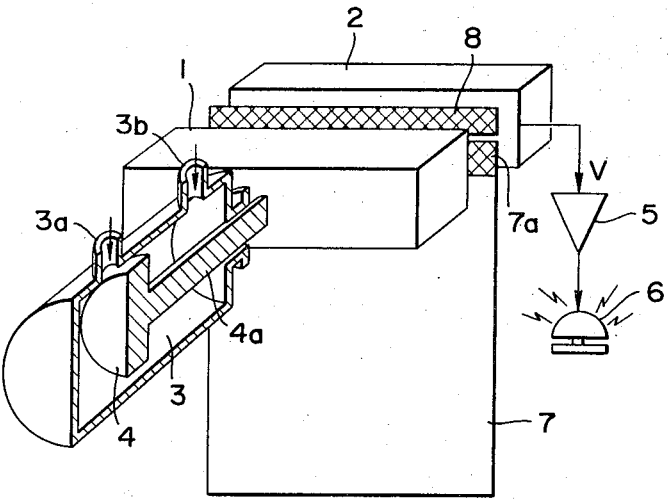
Figure 2A:
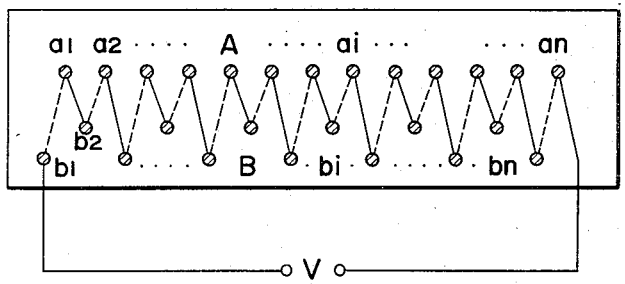
Figure 2B:
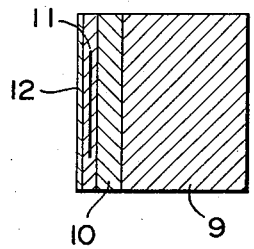

Referring now to the drawings, particularly to FIG. 1, there is shown an apparatus embodying the present invention, which includes a theraml member in the form of a bar or frame or a ring, for example, 1 which is to be heated or cooled by a suitable means. The heated or cooled bar member 1 is positioned opposite to a detector 2 and is movable towards and away from the detector 2. The bar member 1 is connected with a piston rod 4a of a piston 4 which is reciprocally movable in a cylinder 3. The detector 2 is connected to a voltage amplifier 5 which may in turn be connected for example to an alarm device 6. A package 7 having a sealed portion 7a is so positioned that the sealed portion 7a is interposed between the bar member 1 and the detector 2. Between those two members, also, is interposed a reference seal 8 which has no defect or is composed of suitable material that is thermally equivalent to said reference seal 8. The detector 2 is constituted, as shown in FIG. 2, by a base block 9, a thermally and electrically insulating layer 10, a thermo-couple 11, and a protective layer 12. The insulating layer 10 serves to provide insulation between the thermo-couple 11 and the base block 9 and also to provide a cushion effect therebetween. The thermo-couple 11 comprises a portion A having a series of junctions $a_1, a_2 \ldots a_n$ and another portion B having another series of junctions $b_1, b_2 \ldots b_n$ which are alternately connected as shown in FIG. 2 A. In the illustrated embodiment, the junctions $b_1, b_2 \ldots b_n$ are arranged with spacings of 1 mm and coated by the protective film 12 of a few microns thick.

In operation, the reference seal 8 is positioned in contact with the series of reference junctions $a_1, a_2 \ldots a_n$ and the sealed portion 7a is positioned in contact with the series of junctions $b_1, b_2 \ldots b_n$. Then the bar member 1 is moved toward the detector 2 by introducing compressed air into the cylinder through an air port 3a formed therein, so that both the sealed portion 7a and the reference seal 8 are interposed between the bar member 1 and the detector 2. Thus, the sealed portion 7a and the reference seal 8 are subjected to temperature change under the effect of the temperature of the bar member 1. Representing the temperatures at the junctions $a_1, a_2 \ldots a_n$ by $Ta_1, Ta_2 \ldots Ta_n$, respectively, and at the junctions $b_1, b_2 \ldots b_n$ by $Tb_1, Tb_2 \ldots Tb_n$, respectively, then the output V of the detector 2 can be represented by the following equation $$V = K(Ta_1 - Tb_1) + K(Ta_2 - Tb_2) + \ldots + K(Ta_n - Tb_n) = K \sum_{i=1}^{n} (Ta_i - Tb_i)$$

where: K is a constant.

When there is no defect in the sealed portion 7a, the temperature $Tb_i$ at the junction $b_i$ will be equal to that $Ta_i$ at the junction $a_i$ so that there will be no output voltage generated in the detector 2. Therefore, the voltage amplifier 5 does not produce any output and the alarm device 6 does not produce any alarm.

When there is any defect in the sealed portion 7a, on the other hand, the temperature change at the junction $b_i$ corresponding to the defective area will be different from that at the reference junction $a_i$, so that an output is produced in the detector 2. This output then is amplified by the amplifier 5 and used to operate the alarm device 6.

Figure 3:
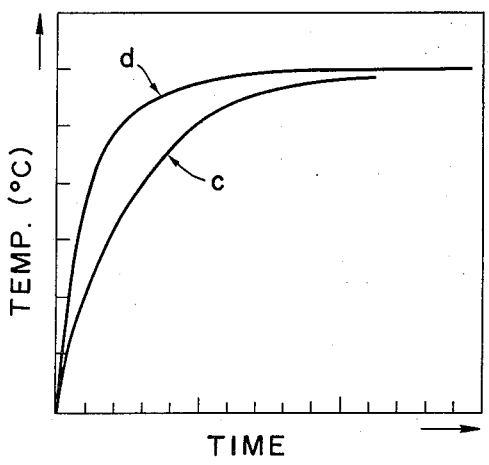
FIGS. 3 and 5 are diagrams showing temperature changes in a sealed portion.
Figure 4:
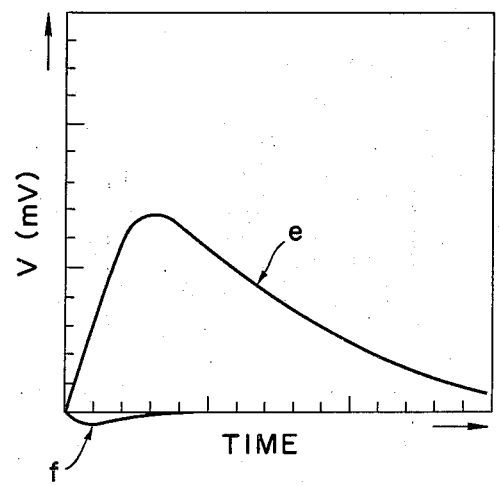
FIGS. 4 and 6 are diagrams showing the outputs of the temperature detector.

FIG. 3 shows increasing temperature with time $t$ in a sealed portion when two laminated sheets each including a polyethylene sheet of 70 microns thick, an aluminum sheet of 9 microns thick and a polyester film of 12 microns thick are heat sealed at their polyethylene sheets. The sealed portion was 8 mm wide and 50 mm long and heated by a heating bar member 1° of 100°C. The temperature of the detector 2 and that of the sealed portion 7a were 40°C before they are heated. The curve (c) in FIG. 3 shows increasing temperature in a defective sealed portion having 1 mg of curry source therein, while the curve (d) shows increasing temperature in a non-defective seal. The abscissa represents the time while the ordinate represents the temperature. From FIG. 3, it will be apparent that the increasing rate of the temperature in the defective seal is lower than that in the non-defective seal. Since the output voltage V of the detector 2 is proportional to the temperature differences between the series of junctions $a_1, a_2 \ldots a_n$ and the series of junctions $b_1, b_2 \ldots b_n$, the output of the detector 2 increases as the contaminants in the sealed portion 7a increases. FIG. 4 shows the output of the detector 2 corresponding to the temperature difference between the curves (c) and (d) shown in FIG. 3. In FIG. 4, the curve (d) shows the output when thereis a defect in the seal, while the curve (f) shows the output when there is no defect. Typical examples of the output of the detector 2 are enumerated in Table 1.

TABLE I

| Type | Contaminants Amount | Number of defects | Maximum output |
|---|---|---|---|
| curry source | 0.5 mg | One | 0.05 mv |
| " | 0.5 mg | Two | 0.09 mv |
| " | 1.0 mg | One | 0.07 mv |
| water | 0.5 mg | One | 0.03 mv |
| " | " | Two | 0.05 mv |
| " | 1.0 mg | One | 0.04 mv |
| None | — | — | 0.007 mv |

Figure 5:
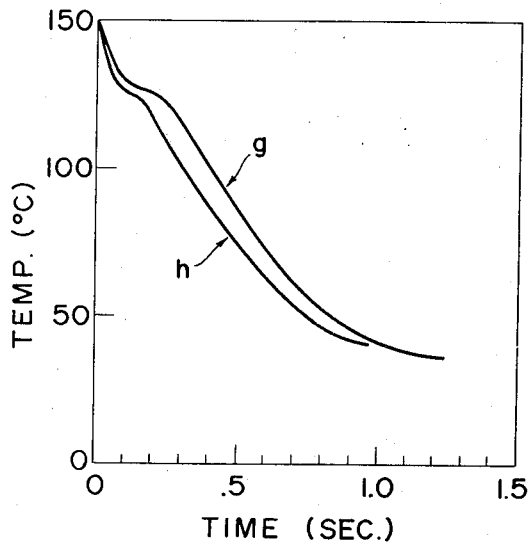
Figure 6:
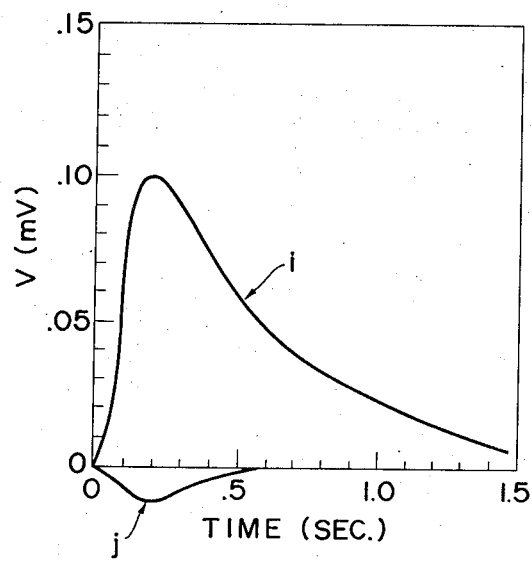

FIG. 5 shows two curves of decreasing temperature in the sealed portion 7a when the portion 7a of 150°C is interposed between the bar member 1 and the detector 2 of room temperature. The curve (g) shows the temperature of the sealed portion which includes 1 mg of curry source while the curve (h) shows that of a normal seal. From the drawing, it will be apparent that the temperature in the defective seal decreases more slowly than the normal seal. The curve (i) in FIG. 6 represents the output of the detector obtained by testing a defective seal including 1 mg of curry source while the curve (j) represents the output obtained by testing the normal seal. Thus, it should also be noted that the output of the detector 2 increases as the contaminants in the sealed portion 7a increase. Table II shows the actual value of the detector output.

TABLE II

| Type | Contaminants Amount | Number of defects | Maximum output |
|---|---|---|---|
| curry source | 0.5 mg | One | 0.08 mv |
| " | 0.5 mg | Two | 0.14 mv |
| " | 1.0 mg | One | 0.10 mv |
| none | — | — | 0.01 mv |

From the Tables I and II, it should be noted that the output of the detector increases as the amount of contaminant and/or the number of defect increases. Thus, it is possible to sound an alarm when the output voltage (V) of the detector 2 exceeds a predetermined value.

FIG. 7 shows another embodiment of the present invention. In FIG. 7, corresponding parts are designated by the same numerals as in the previous embodiment with a number 100 added thereto. In this embodiment, a separate reference seal 8 as used in the previous embodiment is not provided but, as shown in FIG. 8a, the detector 102 is divided into a plurality of thermocouple segments $A_1, A_2, A_3$ and $A_4$. Each of the segments comprises, as shown in FIG. 8 B, thermo-couples 109 which wind around a foamed silicone rubber block 108 in such a manner that a series of junctions are disposed at one side of the block and another series of junctions at the opposite side of the block. The thermo-couples 109 are coated by a protective film 110 and secured to a base block 112 together with a foamed silicone rubber block 111. FIG. 9 is an enlarged perspective view of the thermo-couples 109 and the foamed silicone rubber block 108. Each of the thermo-couple segments $A_1$ through $A_4$ has the same number of junctions which are connected in series as shown in FIG. 9.

Referring to FIG. 9, the series of the junctions $a_{i1}, a_{i2} \ldots a_{in}$ are disposed at the outboard side while the series of the junctions $b_{i1}, b_{i2} \ldots b_{in}$ are disposed at the side adjacent to the base block 112 so that the temperature of the junctions $b_{i1}, b_{i2} \ldots b_{in}$ are considered as being substantially constant $T^o$ while the junctions $a_{i1}, a_{i2} \ldots a_{in}$ are subjected to the temperature of the sealed portion to be inspected.

Assuming that the junctions $a_{i1}, a_{i2} \ldots a_{in}$ in the segment $Ai$ are subjected to temperature of $T_{i1}, T_{i2} \ldots T_{in}$, respectively, the output (Vi) of the segment Ai can be represented by the following equation;

$$Vi = K(T_{i1} - T^0) + K(T_{i2} - T^0)$$
$$+ \ldots + K(T_{in} - T^0)$$
$$= K \sum_{k=1}^{n} T_{ik} - nKT^0$$

where: K is the thermo-electro-motive force constant Similarly, the output $Vj$ of another segment $Aj$ can be represented by the following equation;

$$Vj = K \sum_{k=1}^{n} Tjk - nKT^0$$

If the segments $Ai$ and $Aj$ are connected together in such a manner that their outputs $Vi$ and $Vj$ are cancelled with each other, the combined output can be represented by the following equation;

$$Vij = Vi - Vj = K \left( \sum_{k=1}^{n} Tik - \sum_{k=1}^{n} Tjk \right)$$

From the above equation, it will be seen that, when there is a temperature difference between the segments $Ai$ and $Aj$, an output V is produced in the detector 102. The output V is then amplified by the amplifier 105 to energize the alarm device 106.

In operation, the sealed portion 107a of a package 107 is interposed between the heating or cooling bar member 101 and the detector 102 under the action of the air cylinder 103 and the piston 104. Then, the temperature in the sealed portion 107a is sensed by the thermocouple segments $A_1$ through $A_4$ and, if there is any difference between the temperatures sensed by the segments, an output is produced in the detector 102 and transmitted into the amplifier 105 which then produces an output for energizing the alarming device 106.

FIG. 10 shows a typical example in which the detector 102 comprises two thermo-couple segments $A_1$ and $A_2$ which are connected to an amplifier (AMP). The output of the amplifier (Amp) is introduced through a full wave rectifier (D) into a recorder (R).

The output of the amplifier (Amp) as recorded by the recorder (R) is shown in FIGS. 11 and 12. FIG. 11 shows experimental data obtained by interposing a sealed portion of room temperature between the heating bar member of 200°C and the detector of 150°C. In FIG. 11, the curve ($k$) shows an output corresponding to a normal sealed portion and the cruve (1) shows an output corresponding to a defective seal including 1 mg of curry source in the area corresponding to the segment $A_1$. FIG. 12 shows experimental data obtained by a sealed portion of 150°C interposed between the cooling bar member and the detector both maintained at room temperature. In FIG. 12, the curve ($m$) shows an output corresponding to a normal sealed portion while the curve ($n$) shows an output corresponding to a defective seal including 1 mg of curry source in the area corresponding to the segment $A_1$ of the detector 102.

From FIGS. 11 and 12, it will be apparent that there is substantially no output when there is no defect in the sealed portion, however, a noticeable output is produced in a short time, such as 0.2 to 0.5 second, after the test starts when there are defects in the sealed portion. Tables III and IV show experimental data of the maximum output voltage at the recorder (R) under various conditions.

TABLE III

| Type | Contaminants Amount (mg) | Number of defects in segment $A_1$ | Number of defects in segment $A_2$ | Maximum output (v) |
|---|---|---|---|---|
| curry source | 1 | One | None | 0.3 |
| " | " | Two | One | 0.17 |
| " | " | One | One | 0.06 |
| " | " | Two | None | 0.5 |
| water | " | One | None | 0.2 |
| " | "One | Two | | 0.13 |
| " | " | One | One | 0.05 |
| " | " | Two | None | 0.39 |
| none | — | — | — | 0.007 |

TABLE IV

| Type | Contaminants Amount (mg) | Number of defects in segment $A_1$ | Number of defects in segment $A_2$ | Maximum output (v) |
|---|---|---|---|---|
| curry source | 1 | One | None | 0.10 |
| " | " | Two | One | 0.09 |
| " | " | One | One | 0.02 |
| " | " | Two | None | 0.17 |
| none | — | — | — | 0.008 |

The data in Table III show the results obtained by using the heating bar member 101 of 200°C, the detector 102 of 150°C and the sealed portion of room temperature, while the data in Table IV show the results obtained by using the bar member 102 and the detector both of room temperature and the sealed portion of 150°C. From the tables, it will be noted that the output of the detector corresponds to the amount of contaminant in the sealed portion. However, if there are similar defects in both of the areas corresponding to the segments $A_1$ and $A_2$, no remarkable output will be produced in the detector. This problem can be solved by the arrangement shown in FIG. 13.

In the arrangement shown in FIG. 13, the detector had four thermo-couple segments $A_1$, $A_2$, $A_3$ and $A_4$ as shown in FIG. 8, each of the segments being constituted in like manner shown in FIG. 9. The thermo-couple segments $A_1$, $A_2$, $A_3$ and $A_4$ are respectively connected to amplifiers ($Amp_1$), ($Amp_2$), ($Amp_3$) and ($Amp_4$). The characters ($I_{n1}$) and ($I_{n2}$) designate inverters; $Ad1$, $Ad2$, $Ad3$, $Ad4$, $Ad5$, $Ad6$ and $Ad7$ adders; $D_1$, $D_2$, $D_3$ and $D_4$ full wave rectifiers; and 106 an alarming device, all of which are connected as shown in the drawing. Representing the outputs of the thermo-couple segments $A_1$, A2, A3 and A4 by $V_1$, V2, V3 and V4 respectively and the amplifying rate of the amplifiers by G, then the outputs of the amplifiers (Amp1), (Amp2), (Amp3) and (Amp4) can be represented by $GV_1$, GV2, GV3 and GV4, respectively. Each of the inverters serves to produce an output which is opposite in polarity to the input, while the adder produces an output which is the sum of inputs. Therefore, the outputs V13, V42, V12 and V43 of the adders $Ad1$, $Ad2$, $Ad3$ and $Ad4$, respectively, can be represented as follows.

$$V13 = G(V_1 - V_3), V42 = G(V4 - V2)$$
$$V12 = G(V_1 - V2), V43 = G(V4 - V3)$$

The rectifiers D1, D2, D3 and D4 produce outputs which are equal to the absolute values of the inputs. Thus, the outputs V13, V42 V12 and V43 of the rectifiers $D_1$, D2, D3 and D4 can be represented as follows.

$V13 = G(V_1 - V3)$, $V42 = G(V4 - V2)$
$V12 = G(V_1 - V2)$, $V43 = G(V4 - V3)$ The outputs V1342 and V1243 of the adders Ad5 and Ad6 can be represented as follows.
$V1342 = G(V_1 - V3) + G(V4 - V2)$
$V1243 = G(V_1 - V2) + G(V4 - V3)$ According to this arrangement, except in the case wherein there are completely similar defects in all of the sealed areas corresponding to the segments $A_1$, A2, A3 and A4, any defect in a sealed portion can be effectively detected. In order to detect such a case as described above which however is very rate, the detector may be divided into more than four segments.

Sealed portions each comprising laminated sheets including a polyethylene film of 70 microns thick, an aluminum sheet of 9 microns thick and a polyester film of 12 microns thick, said sheets being heat sealed at the polyethylene films, have been inspected under various conditions using the apparatus shown in FIG. 13. The results are shown in Tables V and VI. The data shown in the Table V are the results obtained by using a heating bar member of 200°C, a detector of 150°C and a sealing portion of room temperature, while the data shown in Table VI are the results obtained by using a cooling bar member and a detector of room temperature and a sealed portion of 150°C. From the tables, it will be seen that the output of the detector changes in accordance with the amount of contaminant in the sealed portion.

TABLE V

| Type | Contaminants Amount (mg) | Number of defect A1 | A2 | A3 | A4 | Maximum output at recorder (D) |
|---|---|---|---|---|---|---|
| curry source | 1 | One | None | None | None | 0.3 |
| Do | 1 | One | One | None | None | 0.6 |
| Do | 1 | One | One | One | None | 0.6 |
| Do | 1 | One | One | One | One | 0.07 |
| Do | 1 | Two | None | None | None | 0.5 |
| Do | 1 | Two | One | None | None | 1.0 |
| Do | 1 | Two | One | One | None | 1.0 |
| Do | 1 | Two | One | One | One | 0.4 |
| none | | | | | | 0.01 |

TABLE VI

| Type | Contaminants Amount (mg) | Number of defect A1 | A2 | A3 | A4 | Maximum output at recorder (D) |
|---|---|---|---|---|---|---|
| curry source | 1 | One | None | None | None | 0.1 |
| Do | 1 | One | One | None | None | 0.2 |
| Do | 1 | One | One | None | One | 0.2 |
| Do | 1 | One | One | One | One | 0.05 |
| Do | 1 | Two | None | None | None | 0.17 |
| Do | 1 | Two | One | None | None | 0.36 |
| Do | 1 | Two | One | One | None | 0.38 |
| Do | 1 | Two | One | One | One | 0.18 |
| none | | | | | | 0.01 |

FIGS. 14 A and 14 B show a temperature sensitive electric resistance wire element which may be used in the place of the thermo-coupled (A1, A2, A3 or A4) used in the previous embodiment. The element includes a wire 113 disposed in zig-zag form such as shown by the references B2 or B3. The wire 113 is secured on a foamed silicone rubber block 111 which is secured to a base block 112. Further, the wire 113 is coated by a protective film 114. FIG. 15 shows an example of a bridge circuit for converting the change in resistance of a wire 113 due to a temperature change into an electric voltage. Representing the resistance of the wire at an area $B_i$ at a temperature T° by $rbi$, and other three resistances of the bridge arms by $r_1$, $r_2$ and $r_3$, respectively, and assuming that the bridge is in a balanced condition, the output $Vbi$ of the bridge circuit can be represented by the following equation when the temperature is changed to T and the resistance of the wire is changed by $\Delta rbi$;

$Vbi = rbi \cdot r1/(rbi + r1)2 \cdot \Delta rbi/rbi \cdot E$ where E represents the voltage of the power source. Since the resistance change $\Delta rbi$ is proportional to the temperature change $\Delta T$, the output of the bridge circuit is proportional to the temperature change $\Delta T$. This relationship can be represented by the following equation. $Vbi = P\Delta T = P(T - T°)$; where P is constant. Thus, it is possible to use such wires 113 in the place of thermo-couple segments $A_1$, $A_2$, $A_3$ and $A_4$ in the previous embodiment, to obtain similar results.

FIG. 16 shows an example using a detector in which two wires 113 are arranged in the areas $B_1$ and $B_2$ respectively. In FIG. 16, the character (r) designates a variable resistor for balancing the bridge circuit and E a power source. Other parts of the circuit are similar to those used in the circuit shown in FIG. 10. Tests have been performed using the circuit of FIG. 16 with the heating bar member 101 of 200°C, the detector 102 of 150°C and the sealed portion 107a of room temperature. The results are shown in Table VII.

TABLE VII

| Contaminants Type | Amount | Number of defects B1 | B2 | Maximum output at recorder (D) |
|---|---|---|---|---|
| curry source | 1 | One | None | 0.5 |
| " | " | Two | One | 0.2 |
| " | " | One | One | 0.05 |
| " | " | Two | None | 0.8 |
| none | — | — | — | 0.01 |

From the above description, it will be apparent that the present invention provides a novel method and apparatus in which a sealed portion of a package can be inspected by simply interposing the sealed portion between a heating or cooling bar member and a temperature detector.

Although the invention has thus been shown and described with reference to preferred embodiments, it should be understood that the invention is in no way limited to the details of the illustrated embodiments but many changes and modifications can be made without departing from the scope of the appended claims.

We claim:
1. Apparatus for detecting defects in a sealed portion of a package movable along a predetermined feeding path comprising,
   a thermal member for varying the temperature of the sealed portion,
   means for selectively moving said thermal member toward and away from one side of said sealed portion, a detector having groups of thermal sensors and being disposed in alignment with said thermal member at the opposite side of said feeding path, means for causing the one surface of said sealed portion to contact with said thermal member and simultaneously the opposite surface of said sealed portion to contact with the detector and also for causing the release of said sealed portion from contact with said thermal member and said detector, and electric means operated by the electric output of said thermal sensors.

2. An apparatus for detecting defects in a sealed portion of a package according to claim 1, wherein said detector comprises two groups of thermal sensors, one of said groups of sensors being positioned to be brought into contact with a perfectly sealed portion comprising a reference portion and the other of said groups of sensors being positioned to be brought into contact with the package to be tested for possible defects.

3. The apparatus of claim 1 wherein said sensors comprise a plurality of thermo-couples distributed to contact with the surface of the sealed portion to be detected, said sensors of each group being electrically connected in series so that the outputs of said sensors are added.

4. The apparatus of claim 1 wherein said detector includes an electric resistance member as the sensor, said resistance member being distributed throughout the surface of the detector to contact with the whole surface substantially, said electric resistance member being divided into a plurality of groups.

5. The apparatus of claim 1 wherein said detector comprises a plurality of thermo-couples detecting the temperature of said sealed portion, said thermo-couples being divided into a plurality of groups, the thermo-couples in one group being so connected that their outputs are added to each other and with the outputs from the combination consisting of the two groups cancelling each other, means for electrically connecting summation of the absolute total amounts of the output from each combination as an output of said detector.

6. The apparatus of claim 1 wherein said electric means comprises a warning device actuated when the absolute value of differential output between the two couples exceeds a predetermined value.

* * * * *